(12) United States Patent  
Wilson

(10) Patent No.: US 7,585,069 B2
(45) Date of Patent: Sep. 8, 2009

(54) CUSTOMIZATION EYEWEAR SYSTEM FOR EYEWEAR WITH MULTI-COMPARTMENTS

(76) Inventor: Nangwaya Kamau Wilson, 18 Matton St., Apartment 3, Springfield, MA (US) 01105

( * ) Notice: Subject to any disclaimer, the term of this patent is extended or adjusted under 35 U.S.C. 154(b) by 0 days.

(21) Appl. No.: 11/800,518

(22) Filed: May 7, 2007

(65) Prior Publication Data
US 2008/0165317 A1   Jul. 10, 2008

Related U.S. Application Data

(60) Provisional application No. 60/879,166, filed on Jan. 6, 2007.

(51) Int. Cl.
G02C 11/02 (2006.01)
(52) U.S. Cl. .......................................... 351/52; 351/51

(58) Field of Classification Search ................ 351/41, 351/51, 52, 111, 158
See application file for complete search history.

(56) References Cited

U.S. PATENT DOCUMENTS 4,877,320 A * 10/1989 Holden ..................... 351/44
7,261,409 B1 * 8/2007 Taber ........................ 351/52

* cited by examiner

Primary Examiner—Huy K Mai
(74) Attorney, Agent, or Firm—Lambert and Associates; Gary E. Lambert

(57) ABSTRACT

An eyewear system disposed to allow for readily accessible customization comprising at least one and possibly three viewing compartments for replaceable ornamental displays. The displays are all printed on heat transfer paper which allows for easy creation of new designs along with easy replacement of previous displays.

16 Claims, 2 Drawing Sheets

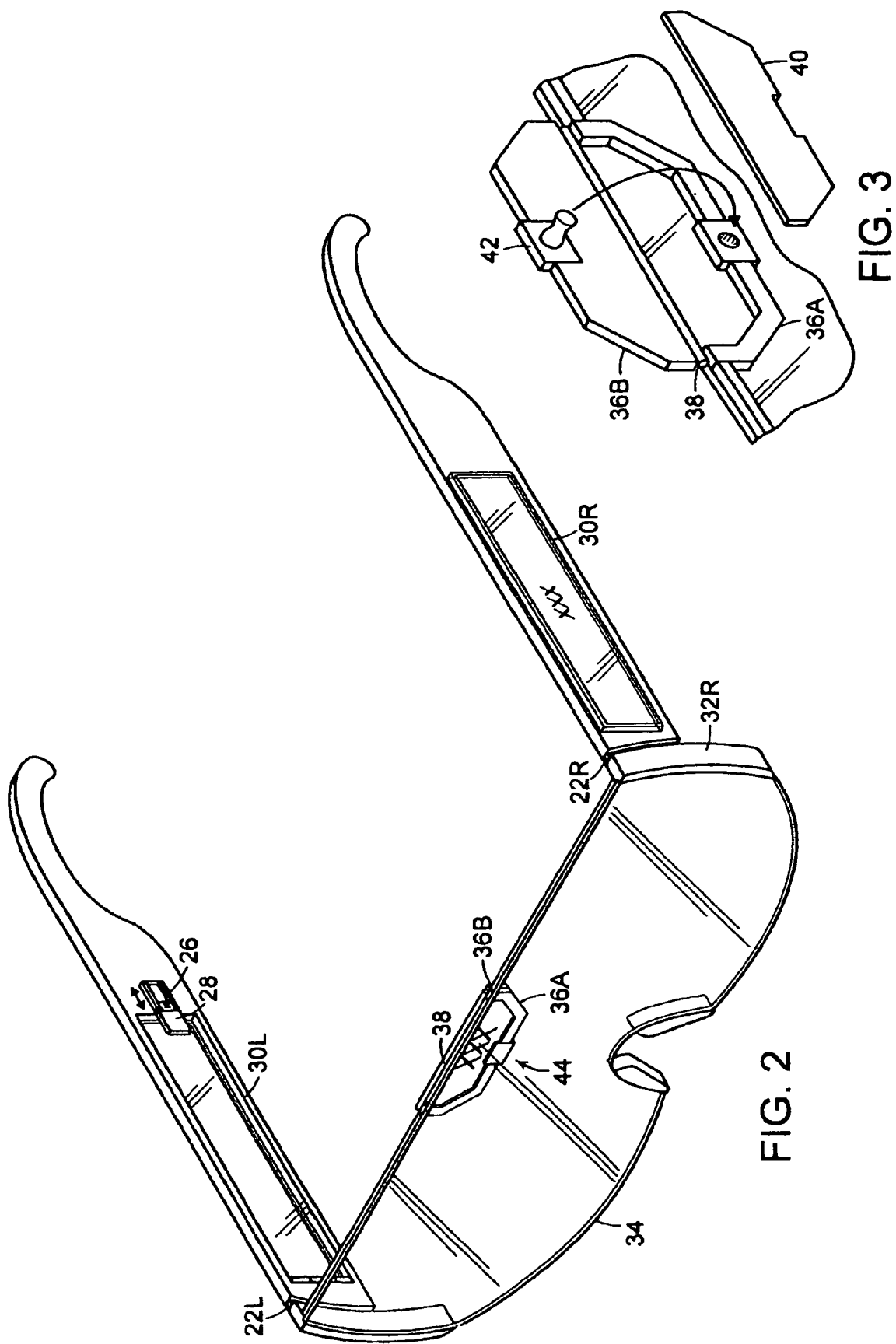

CUSTOMIZATION EYEWEAR SYSTEM FOR EYEWEAR WITH MULTI-COMPARTMENTS

This application claims the benefit of U.S. Provisional Application No. 60/879,166 filed on Jan. 6, 2007.

FIELD OF THE INVENTION

The present invention relates to a type of eyewear that allows the wearer to change the appearance of three different compartments capable of housing heat transfer ready replaceable ornamental displays. Heat transfer paper that can be customized to various colors and designs can then be placed into the ornamental displays.

BACKGROUND OF THE INVENTION

Since the inception of modern eyewear, consumers have been trying to customize their shape, size and color. The current state of the art can be seen as illustrated by the following patents. In U.S. Pat. No. 5,631,718 to Markovitz, temples designed to be adjustable for comfort purposes are disclosed. In U.S. Pat. No. 5,652,637 to Marini, temples that may be removed without any disturbance to the hinge between the eyerim and the temple are illustrated.

Additionally, U.S. Pat. No. 6,023,864 to Liebenow demonstrates an accessory that is releasably engaged to a temple. This releasable accessory is meant for decorative purposes so this is the most related patent to the present invention. However, the attached accessory is attached directly to the temple rather than inserted into a compartment of the temple. U.S. Pat. No. 6,631,194 to Fukuoka reveals an attachment to a temple with a hollow housing. U.S. Pat. No. 6,834,962 to Polovin shows temples that can essentially be "clipped on."

There exists a need for an invention, which facilitates the engagement and removal process for displaying a fanciful message or emblem in eyewear.

SUMMARY OF THE INVENTION

The present invention facilitates the customization of eyewear in order to display a fanciful message or emblem in eyewear. It is an object of the instant invention to introduce eyewear featuring at least one, but possibly a multiplicity of compartments which may be disposed to display a customizable heat transfer paper within the temples of eyewear.

It is therefore an object of the invention to allow the user to change the appearance of the display portions of the eyewear compartments.

It is an additional object of the instant invention to introduce eyewear designed to allow for effortless altering of designs and colors, wholly contingent upon user desire and/or the latest fashion trends.

It is an object of the instant invention to introduce eyewear disposed with compartments which comprise a flexible attachment system, which may be affixed in any one of numerous manners, to the temples in order to allow for the compartments to swing freely. Thus the instant invention facilitates substitution of the transfer paper within said compartments.

It is a further object of the instant invention to introduce eyewear further comprising a locking mechanism utilized to prevent the compartments from opening when the eyewear is being used.

It is another object of the invention to allow the user to introduce an eyewear invention, which allows the user to remove and replace the display portion of the eyewear compartments by a method comprising the opening, closing, locking, unlocking and housing function of the hinged temple eyewear compartments.

It is final object of the instant invention to allow the user to change the appearance of the replaceable temple display portions by heat transfer or by a temple display portions utilizing a preset design.

BRIEF DESCRIPTION OF THE DRAWINGS

FIG. 2 is an isometric view of the eyewear system with all three replaceable ornamental displays engaged.

FIG. 3 is a cutaway view of how the frame compartment secures the replaceable ornamental display in place.

DETAILED DESCRIPTION OF THE INVENTION

Figure 1:
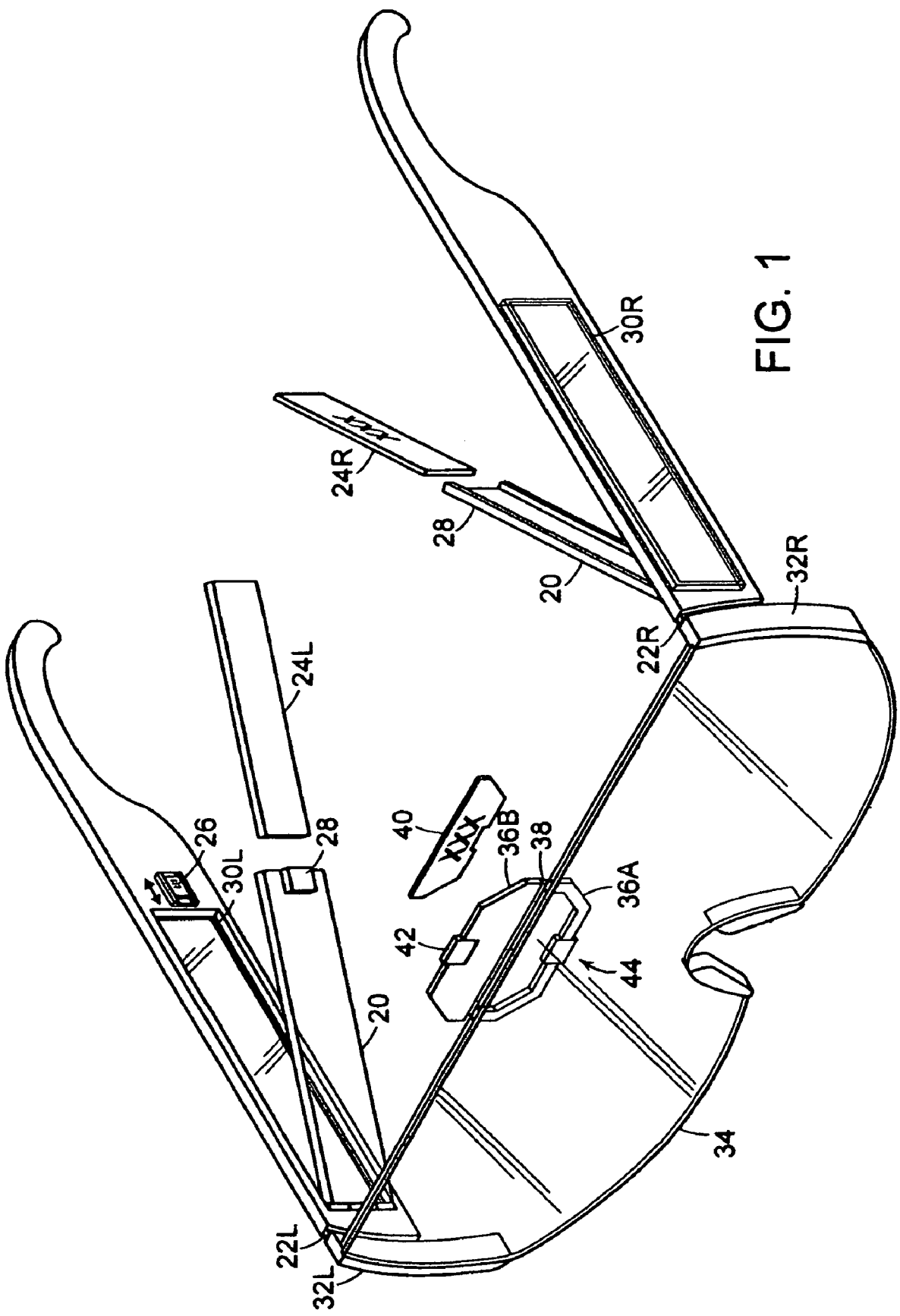
FIG. 1 is an isometric view of the eyewear system with all three replaceable ornamental displays disengaged.

FIG. 1 illustrates the invention with the temple and frame compartments disengaged. The left 30L and right 30R displayable windows are shown when the temple compartments 20 are not secured against the windows. The left temple compartment reaches this state when being swung inwards on its hinge 22L as does the right temple compartment on its hinge 22R. The left 24L and right 24R replaceable ornamental temple displays are shown as they would look when not inserted into the temple compartments 20. The frame compartment inset 44 is shown as well the frame plate 36 that swings downward on hinges 38. The border of the compartment that separates it from the frame is shown in 36A and 36B. The replaceable ornamental frame display is also shown when not engaged 40.

FIG. 2 shows when the temple and frame compartments are engaged. The temple compartments are inserted into the temples and then locked into place with the sliding mechanism. The frame compartment is swung into the secured position and then secured by the frame compartment locking mechanism.

FIG. 3 shows a more detailed view of how the frame compartment is secured into place. The frame compartment plate is "swung down" and then latched by the frame compartment locking mechanism. This can be done with either the replaceable ornamental frame display inserted or not inserted, depending on the preference of the wearer.

At least some portion of the compartments may be constructed in a manner similar to a watch band. This watch like area of the compartments may encompass a circular section where the spring hinges are inserted. Thus a circular section of the watch like area of the compartments with the spring hinge insert may then connect to the an opposing area watch component with preexisting hinge holes, by utilization of compression of the spring hinge and then decompressing or contracting back to original size for a secure fit connecting the watch like area of the compartments and the watch component.

In one embodiment, the instant invention may comprise: an eyewear system comprising an eyerim 34 for securing spectacle frame lenses therein comprising a first end piece 32 R extending from an outer side of the first side of the eyerim 34 and a second end piece 32 L extending from an outer side of the second side of the eyerim, a first temple 22 R attached to and extending from the first end piece 32 R, a second temple 22 L attached to and extending from the second end piece, a first display window apparatus 30 R disposed on an outer portion of the first temple and a second display window apparatus 30 L disposed on an outer portion of the second temple, a first temple compartment 20 flexibly connected to the first temple 22 R, the first temple compartment disposed with a space to fit a replaceable ornamental display 24 R, a first locking mechanism 26, 28 located on the first temple to securely maintain the first temple compartment in direct communication with the first temple and allowing the replaceable ornamental display to be viewable through the displayable window, a second temple compartment 20 flexibly connected to the second temple 22 L, the second temple compartment 20 disposed with a space to fit a replaceable ornamental display 24 L, a second locking mechanism 20, 28 located on the second temple to securely maintain the second temple compartment in direct communication with the second temple and allowing the replaceable ornamental display to be viewable through the displayable window.

The instant embodiment may also comprise a bridge attached to and connecting the inner sides of the first eyerim and the second eyerim, a second locking mechanism located on the second temple to securely maintain the second temple compartment in direct communication with the second temple and allowing the replaceable ornamental display to be viewable through the displayable window, wherein the first compartment and the second compartment are flexibly connected to the first temple and the second temple by a hinged apparatus, and wherein the first and the second locking mechanism comprise a first male sliding lock and a second male sliding lock attached to the first temple and the second temple and disposed to slidably engage with a first female engagement member and a second female engagement member disposed on an inner side of the first compartment and an inner side of the second compartment.

In a further embodiment, the eyewear system may be configured such that the first temple compartment and the second temple compartment further comprise a set of preexisting holes disposed for alignment with a corresponding set of preexisting holes located on the first temple and the second temple are for hingeable engagement through a fastening mechanism. Additionally, the eyewear system may be designed such that the temple compartment is hingedly connected using a screw mechanism securely into a first set of preexisting screw holes in the temple and a first set of preexisting screw holes in the temple compartment. Furthermore, in the instant embodiment, the eyewear system may be disposed wherein the first temple compartment and the second temple compartment are hingedly engaged with the first and the second temple utilizing a protruding groove and recessed groove connecting mechanism.

In a further embodiment, the eyewear system may comprise an eyerim for securing spectacle frame lenses therein comprising a first end niece extending from an outer side of the first eyerim and a second end piece extending from an outer side of the second eyerim, a first temple attached to and extending from the first end piece, a second temple attached to and extending from the second end piece, a first display window apparatus disposed on an outer portion of the first temple and a second display window apparatus disposed on an outer portion of the second temple, a first temple compartment flexibly connected to the first temple, the first temple compartment disposed with a space to fit a replaceable ornamental display, a first locking mechanism located on the first temple to securely maintain the first temple compartment in direct communication with the first temple and allowing the replaceable ornamental display to be viewable through the displayable window, a second temple compartment flexibly connected to the second temple, the second temple compartment disposed with a space to fit a replaceable ornamental display, a second locking mechanism located on the second temple to securely maintain the second temple compartment in direct communication with the second temple and allowing the replaceable ornamental display to be viewable through the displayable window, a bridge attached to and connecting the inner sides of the first eyerim and the second eyerim, a second locking mechanism located on the second temple to securely maintain the second temple compartment in direct communication with the second temple and allowing the replaceable ornamental display to be viewable through the displayable window, wherein the first compartment and the second compartment are flexibly connected to the first temple and the second temple by a hinged apparatus, wherein the first and the second locking mechanism comprise a first male sliding lock and a second male sliding lock attached to the first temple and the second temple and disposed to slidably engage with a first female engagement member and a second female engagement member disposed on an inner side of the first compartment and an inner side of the second compartment, and a circular watch like area disposed upon the compartments may encompass wherein a set of spring hinges are inserted.

In a supplementary embodiment, illustrated is an eyewear system comprising an eyerim for securing spectacle frame lenses, a first end piece and a second end piece attached to and extending from a first outer side and a second outer side of the eyerim, a first temple attached to and extending from the first end piece, a second temple attached to and extending from the second end piece, a first displayable window section facing away from a wearer located within the first temple, a second displayable window section facing away from the wearer located within the second temple, a first temple compartment hingedly connected to the first temple, a second temple compartment hingedly connected to the second temple, a space in the first temple compartment to fit a first replaceable ornamental display, a space in the second temple compartment to fit a second replaceable ornamental display, a first locking mechanism on the first temple to securely maintain the first temple compartment flush against the first temple and allowing the first replaceable ornamental display to be viewable through the first displayable window, a second locking mechanism on the second temple to securely maintain the second temple compartment flush against the second temple and allowing the second replaceable ornamental display to be viewable through the second display window, a bridge attached to and connecting the inner sides of the eyerim and wherein the first locking mechanism uses a first male sliding lock that is attached to the first temple that slidably engages securely with a first female engagement member on a side of the first temple facing the wearer and wherein the second locking mechanism uses a second male sliding lock that is attached to the second temple that slidably engages securely with a second female engagement member on a side of the second temple facing the wearer.

The instant embodiment may also comprise a system wherein the first temple compartment is hingedly connected to the first temple using a first connecting member that fits securely into a first set of preexisting holes in the first temple and a first set of preexisting holes in the first temple compartment and wherein the second temple compartment is hingedly connected to the second temple using a second connecting member that fits securely into a second set of preexisting holes in the second temple and a second set of preexisting holes in the second temple compartment. Further, the instant embodiment of the eyewear system may be configured such that the first temple compartment is hingedly connected to the first temple using a first protruding groove and recessed groove connecting mechanism and the second temple compartment is hingedly connected to second temple using a second protruding groove and recessed groove connecting mechanism.

In an additional configuration, the instant embodiment may comprise an eyewear system wherein the first temple compartment is hingedly connected using a first screw that twists securely into a first set of preexisting screw holes in the first temple and a first set of preexisting screw holes in the first temple compartment and wherein a second screw that twists securely into a second set of preexisting screw holes in the second temple and a second set of preexisting screw holes in the second temple compartment.

In an additional embodiment, an eyewear system is illustrated comprising an eyerim for securing spectacle frame lenses, a first end piece and a second end piece attached to and extending from a first outer side and a second outer side of the eyerim, a first temple attached to and extending from the first end piece, a second temple attached to and extending from the second end piece, a first displayable window section facing away from a wearer located within the first temple, a second displayable window section facing away from the wearer located within the second temple, a first temple compartment hingedly connected to the first temple, a second temple compartment hingedly connected to the second temple, a sufficient space in the first temple compartment to fit a first replaceable ornamental display, a sufficient space in the second temple compartment to fit a second replaceable ornamental display, a first locking mechanism on the first temple to securely maintain the first temple compartment flush against the first temple and allowing the first replaceable ornamental display to be viewable through the first displayable window, a second locking mechanism on the second temple to securely maintain the second temple compartment flush against the second temple and allowing the second replaceable ornamental display to be viewable through the second display window, a bridge attached to and connecting the inner sides of the eyerim, a frame compartment with sufficient space to fit a third replaceable ornamental display mounted to the upper inner side of the eyerim with a third displayable window facing away from the wearer, a plate hingedly attached to the frame compartment comprising a material that allows the plate to be seen through said material, a third locking mechanism that will secure the plate hingedly attached such that the third replaceable ornamental display will be secured firmly in place.

Further, the eyewear system of may include an adaptation wherein the first locking mechanism uses a first male sliding lock that is attached to the first temple that slidably engages securely with a first female engagement member on a side of the first temple facing the wearer and wherein the second mechanism uses a second male sliding lock that is attached to the second temple that slidably engages securely with a second female engagement member on a side of the second temple facing the wearer and wherein the third locking mechanism uses an engaging member attached to the plate that will fit securely into a receiving member attached to the compartment.

Further, the instant eyewear system may encapsulate a design wherein the first temple compartment is hingedly connected using a connecting mechanism that fits securely into a first set of preexisting holes in the first temple and a first set of preexisting holes in the first temple compartment and wherein the second temple compartment is hingedly connected using a connecting mechanism that fits securely into a second set of preexisting holes in the second temple and a second set of preexisting holes in the second temple compartment. And, the instant invention may also encompass an eyewear system wherein the first temple compartment is hingedly connected using a first protruding groove and recessed groove connecting mechanism and the second temple compartment is hingedly connected using a second protruding groove and recessed groove connecting mechanism.

Further, the instant embodiment may introduce an eyewear system wherein the first temple compartment is hingedly connected using a first screw that twists securely into a first set of preexisting screw holes in the first temple and a first set of preexisting screw holes in the first temple compartment and wherein a second screw that twists securely into a second set of preexisting screw holes in the second temple and a second set of preexisting screw holes in the second temple compartment.

Additionally, the eyewear system may comprise designs wherein the engaging member attached to the plate is a square peg and the receiving member is of a square shape or wherein the engaging member attached to the plate is a circular peg and the receiving member is of a circular shape.

Additionally, the eyewear system may comprise a frontal message viewing apparatus 38 comprising a static portion 36A and a dynamic portion 36B which fits into said static portion 36A, further a replaceable ornamental display 40 may be included and a locking mechanism 42. 44.

The invention claimed is:

1. An eyewear system comprising:
an eyerim for securing spectacle frame lenses therein comprising a first end piece extending from a first outer side of said eyerim and a second end piece extending from a second outer side of eyerim;
a first temple attached to and extending from said first end piece;
a second temple attached to and extending from said second end piece;
a first display window apparatus disposed on an outer portion of said first temple and a second display window apparatus disposed on an outer portion of said second temple;
a first temple compartment flexibly connected to said first temple, said first temple compartment disposed with a space to fit a replaceable ornamental display;
a first locking mechanism located on said first temple to securely maintain said first temple compartment in direct communication with said first temple and allowing said replaceable ornamental display to be viewable through said displayable window;
a second temple compartment flexibly connected to said second temple, said second temple compartment disposed with a space to fit a replaceable ornamental display;
a second locking mechanism located on said second temple to securely maintain said second temple compartment in direct communication with said second temple and allowing said replaceable ornamental display to be viewable through said displayable window;
a bridge attached to and connecting the inner sides of said first eyerim and said second eyerim;
a second locking mechanism located on said second temple to securely maintain said second temple compartment in direct communication with said second temple and allowing said replaceable ornamental display to be viewable through said displayable window;
wherein said first compartment and said second compartment are flexibly connected to said first temple and said second temple by a hinged apparatus; and,
wherein said first and said second locking mechanism comprise a first male sliding lock and a second male sliding lock attached to said first temple and said second temple and disposed to slidably engage with a first female engagement member and a second female engagement member disposed on an inner side of said first compartment and an inner side of said second compartment.

2. The eyewear system of claim 1 wherein said first temple compartment and said second temple compartment further comprise a set of preexisting holes disposed for alignment with a corresponding set of preexisting holes located on said first temple and said second temple are for hingeable engagement through a fastening mechanism.

3. The eyewear system of claim 1, wherein said temple compartment is hingedly connected using a screw mechanism securely into a first set of preexisting screw holes in said temple and a first set of preexisting screw holes in said temple compartment.

4. The eyewear system of claim 1, wherein said first temple compartment and said second temple compartment are hingedly engaged with said first and said second temple utilizing a protruding groove and recessed groove connecting mechanism.

5. An eyewear system comprising:
- an eyerim for securing spectacle frame lenses therein comprising a first end piece extending from a first outer side of said eyerim and a second end piece extending from a second outer side of said eyerim;
- a first temple attached to and extending from said first end piece;
- a second temple attached to and extending from said second end piece;
- a first display window apparatus disposed on an outer portion of said first temple and a second display window apparatus disposed on an outer portion of said second temple;
- a first temple compartment flexibly connected to said first temple, said first temple compartment disposed with a space to fit a replaceable ornamental display;
- a first locking mechanism located on said first temple to securely maintain said first temple compartment in direct communication with said first temple and allowing said replaceable ornamental display to be viewable through said displayable window;
- a second temple compartment flexibly connected to said second temple, said second temple compartment disposed with a space to fit a replaceable ornamental display;
- a second locking mechanism located on said second temple to securely maintain said second temple compartment in direct communication with said second temple and allowing said replaceable ornamental display to be viewable through said displayable window,
- a bridge attached to and connecting the inner sides of said first eyerim and said second eyerim;
- a second locking mechanism located on said second temple to securely maintain said second temple compartment in direct communication with said second temple and allowing said replaceable ornamental display to be viewable through said displayable window;
- wherein said first compartment and said second compartment are flexibly connected to said first temple and said second temple by a hinged apparatus,
- wherein said first and said second locking mechanism comprise a first male sliding lock and a second male sliding lock attached to said first temple and said second temple and disposed to slidably engage with a first female engagement member and a second female engagement member disposed on an inner side of said first compartment and an inner side of said second compartment; and,
- a circular watch like area disposed upon said compartments may encompass wherein a set of spring hinges are inserted.

6. An eyewear system comprising:
- an eyerim for securing spectacle frame lenses;
- a first end piece and a second end piece attached to and extending from a first outer side and a second outer side of said eyerim;
- a first temple attached to and extending from said first end piece;
- a second temple attached to and extending from said second end piece;
- a first displayable window section facing away from a wearer located within said first temple;
- a second displayable window section facing away from said wearer located within said second temple;
- a first temple compartment hingedly connected to said first temple;
- a second temple compartment hingedly connected to said second temple;
- a space in said first temple compartment to fit a first replaceable ornamental display;
- a space in said second temple compartment to fit a second replaceable ornamental display;
- a first locking mechanism on said first temple to securely maintain said first temple compartment flush against said first temple and allowing said first replaceable ornamental display to be viewable through said first displayable window;
- a second locking mechanism on said second temple to securely maintain said second temple compartment flush against said second temple and allowing said second replaceable ornamental display to be viewable through said second display window;
- a bridge attached to and connecting the inner sides of said eyerim; and,
- wherein said first locking mechanism uses a first male sliding lock that is attached to said first temple that slidably engages securely with a first female engagement member on a side of said first temple facing said wearer and wherein said second locking mechanism uses a second male sliding lock that is attached to said second temple that slidably engages securely with a second female engagement member on a side of said second temple facing said wearer.

7. The eyewear system of claim 6, wherein said first temple compartment is hingedly connected to said first temple using a first connecting member that fits securely into a first set of preexisting holes in said first temple and a first set of preexisting holes in said first temple compartment and wherein said second temple compartment is hingedly connected to said second temple using a second connecting member that fits securely into a second set of preexisting holes in said second temple and a second set of preexisting holes in said second temple compartment.

8. The eyewear system of claim 6, wherein said first temple compartment is hingedly connected to said first temple using a first protruding groove and recessed groove connecting mechanism and said second temple compartment is hingedly connected to second temple using a second protruding groove and recessed groove connecting mechanism.

9. The eyewear system of claim 6, wherein said first temple compartment is hingedly connected using a first screw that twists securely into a first set of preexisting screw holes in said first temple and a first set of preexisting screw holes in said first temple compartment and wherein a second screw that twists securely into a second set of preexisting screw holes in said second temple and a second set of preexisting screw holes in said second temple compartment.

10. An eyewear system comprising:
- an eyerim for securing spectacle frame lenses;
- a first end piece and a second end piece attached to and extending from a first outer side and a second outer side of said eyerim;
- a first temple attached to and extending from said first end piece;
- a second temple attached to and extending from said second end piece;
- a first displayable window section facing away from a wearer located within said first temple;
- a second displayable window section facing away from said wearer located within said second temple;
- a first temple compartment hingedly connected to said first temple;
- a second temple compartment hingedly connected to said second temple;
- a sufficient space in said first temple compartment to fit a first replaceable ornamental display;
- a sufficient space in said second temple compartment to fit a second replaceable ornamental display;
- a first locking mechanism on said first temple to securely maintain said first temple compartment flush against said first temple and allowing said first replaceable ornamental display to be viewable through said first displayable window;
- a second locking mechanism on said second temple to securely maintain said second temple compartment flush against said second temple and allowing said second replaceable ornamental display to be viewable through said second display window;
- a bridge attached to and connecting the inner sides of said eyerim;
- a frame compartment with sufficient space to fit a third replaceable ornamental display mounted to the upper inner side of said eyerim with a third displayable window facing away from the wearer;
- a plate hingedly attached to said frame compartment made out of a material that allows said plate to be seen through;
- a third locking mechanism that will secure said plate hingedly attached in a way that said third replaceable ornamental display will be secured firmly in place.

11. The eyewear system of claim 10 wherein said first locking mechanism uses a first male sliding lock that is attached to said first temple that slidably engages securely with a first female engagement member on a side of said first temple facing said wearer and wherein said second mechanism uses a second male sliding lock that is attached to said second temple that slidably engages securely with a second female engagement member on a side of said second temple facing said wearer and wherein said third locking mechanism uses an engaging member attached to said plate that will fit securely into a receiving member attached to said compartment.

12. The eyewear system of claim 11, wherein said first temple compartment is hingedly connected using a connecting mechanism that fits securely into a first set of preexisting holes in said first temple and a first set of preexisting holes in said first temple compartment and wherein said second temple compartment is hingedly connected using a connecting mechanism that fits securely into a second set of preexisting holes in said second temple and a second set of preexisting holes in said second temple compartment.

13. The eyewear system of claim 11, wherein said first temple compartment is hingedly connected using a first protruding groove and recessed groove connecting mechanism and said second temple compartment is hingedly connected using a second protruding groove and recessed groove connecting mechanism.

14. The eyewear system of claim 11, wherein said first temple compartment is hingedly connected using a first screw that twists securely into a first set of preexisting screw holes in said first temple and a first set of preexisting screw holes in said first temple compartment and wherein a second screw that twists securely into a second set of preexisting screw holes in said second temple and a second set of preexisting screw holes in said second temple compartment.

15. The eyewear system of claim 11, wherein said engaging member attached to said plate is a square peg and said receiving member is of a square shape.

16. The eyewear system of claim 11, wherein said engaging member attached to said plate is a circular peg and said receiving member is of a circular shape.

* * * * *